US008200364B2

(12) United States Patent
Rosen et al.

(10) Patent No.: US 8,200,364 B2
(45) Date of Patent: Jun. 12, 2012

(54) INTELLIGENT MAIL SYSTEM

(75) Inventors: Richard Rosen, Trumbull, CT (US); Rana Dutta, Easton, CT (US)

(73) Assignee: Neopost Technologies, Bagneux (FR)

( * ) Notice: Subject to any disclaimer, the term of this patent is extended or adjusted under 35 U.S.C. 154(b) by 834 days.

(21) Appl. No.: 11/141,174

(22) Filed: May 31, 2005

(65) Prior Publication Data

US 2006/0271236 A1 Nov. 30, 2006

(51) Int. Cl.
*G06F 7/00* (2006.01)

(52) U.S. Cl. ........ 700/226; 700/225; 700/221; 700/220; 700/213

(58) Field of Classification Search .................. 700/213, 700/214, 215, 216, 217, 219, 220, 221, 222, 700/223, 224, 225, 226

See application file for complete search history.

(56) References Cited

U.S. PATENT DOCUMENTS

| | | | | |
|---|---|---|---|---|
| 5,317,654 A * | 5/1994 | Perry et al. | .................... | 382/101 |
| 5,612,889 A * | 3/1997 | Pintsov et al. | ................ | 700/226 |
| 6,205,373 B1 * | 3/2001 | Hart et al. | ..................... | 700/222 |
| 6,266,575 B1 * | 7/2001 | Anderson et al. | ............. | 700/221 |
| 6,370,446 B1 * | 4/2002 | Divine | .......................... | 700/226 |
| 6,385,504 B1 * | 5/2002 | Pintsov et al. | ................ | 700/226 |
| 6,732,011 B1 * | 5/2004 | Hart et al. | ..................... | 700/223 |
| 2003/0114955 A1 * | 6/2003 | Daniels, Jr. | ................... | 700/224 |
| 2004/0215368 A1 * | 10/2004 | Baker et al. | ................... | 700/226 |
| 2004/0260424 A1 * | 12/2004 | Mahar | ........................... | 700/216 |

* cited by examiner

*Primary Examiner* — Patrick MacKey
(74) *Attorney, Agent, or Firm* — Morris & Kamlay LLP

(57) ABSTRACT

A mail system including a tracking and reporting system that is adapted to integrate address information together with a unique code on at least one mailpiece, wherein the address information and code are linked, an in-process tracking and archiving system that is adapted to track the mailpiece as the address information and code are printed on the mailpiece and during a mailpiece insertion process to verify that the at least one mailpiece is inserted into a mailer and store an electronic copy of the mailpiece with the address information and code in an archive, an in-bound data capture of return mail system that scans the unique code and automatically links the mailpiece to account information stored in an account database and an postal address update and management system that is linked to a postal service database for verifying address information and correcting address errors.

9 Claims, 6 Drawing Sheets

INTELLIGENT MAIL SYSTEM

BACKGROUND OF THE INVENTION

1. Field of the Invention

The present invention generally relates to processing of mail and an integrated system for mail processing.

2. Brief Description of Related Developments

Present mailing applications that afford the customer generating mailpieces the ability to track the progress of the mailpieces through the postal mailing infrastructure and eventually to the recipient involve special material handling by the mailpiece generator. This typically involves the use of different codes printed on the envelope that can be scanned and read at various stages of the mail delivery process.

SUMMARY OF THE INVENTION

The present invention is directed to a mail system. In one embodiment the mail system includes a tracking and reporting system that is adapted to integrate address information together with a unique code on at least one mailpiece, wherein the address information and code are linked, an in-process tracking and archiving system that is adapted to track the mailpiece as the address information and code are printed on the mailpiece and during a mailpiece insertion process to verify that the at least one mailpiece is inserted into a mailer and store an electronic copy of the mailpiece with the address information and code in an archive, an in-bound data capture of return mail system that scans the unique code and automatically links the mailpiece to account information stored in an account database and an postal address update and management system that is linked to a postal service database for verifying address information and correcting address errors.

The present invention is directed to a mail system. In one embodiment the mail system includes a tracking and reporting system, an in-process tracking and archiving system, an in-bound data capture of return mail system and an postal address update and management system.

In one aspect, the present invention is directed to a method of processing a mailpiece in a postal system. In one embodiment the method includes retrieving address information from a database, forming a unique code that corresponds to the address information, linking the unique code to the database, printing the unique code on the mailpiece to allow tracking of the mailpiece through the postal system and payment of postage, monitoring insertion of the mailpiece into the mailing package prior to the mailpiece entering a mail stream and recording the insertion of the mailpiece in the mailing package in a database.

In a further aspect, the present invention is directed to a system for mail tracking. A mail creation print file is linked to an archival and retrieval system, in-process tracking, and a mail tracking system. Postage is automatically printed and addresses are verified for accuracy and compliance with the mail service requirements. Letters in mailpieces are tracked to the page level. A mailpiece or document may comprise multiple pages. Each page is verified as being printed and the pages are verified as being inserted into the envelope. It is verified that the letter reached the post and that it left the post. The pages of the letter that were printed can be verified as can exactly which pages were in the envelope. The exact contents of the envelope can also be reprinted.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(S)

Figure 1:
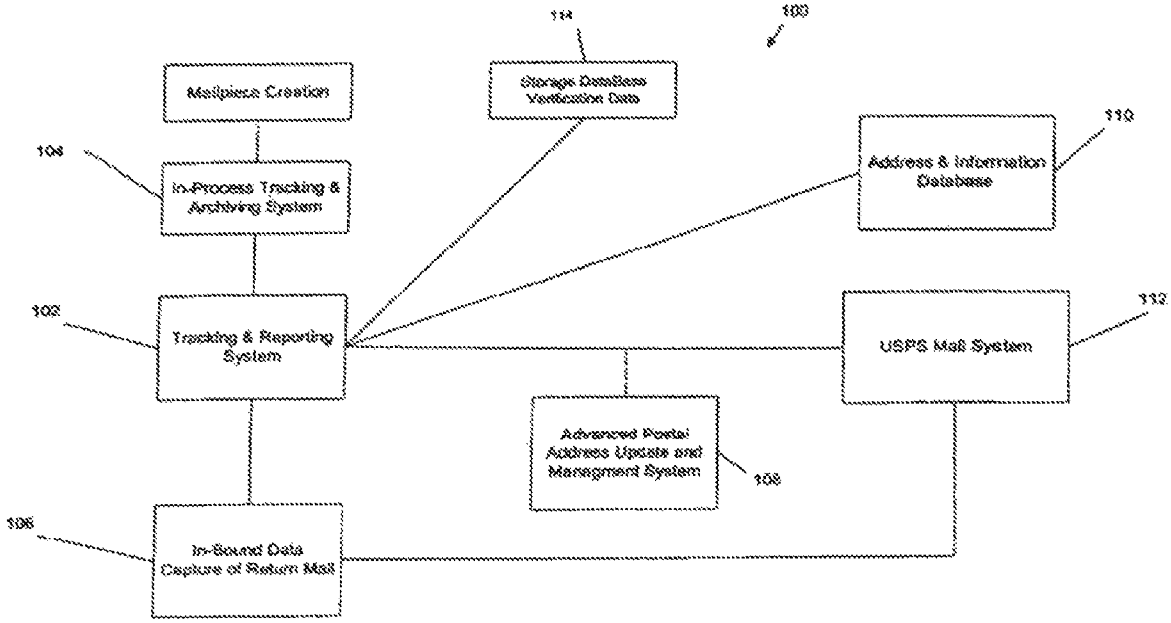
FIG. 1 is a block diagram of one embodiment of a system incorporating features of the present invention.

Referring to FIG. 1, a perspective view of a system 100 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

The present invention is directed to an integrated system that leverages postal information and codes to enhance the value of mail, mail delivery and information about the mail including the actual contents of the mail. Referring to FIG. 1, the mail system 100 incorporating features of the present invention generally comprises a Tracking and Reporting System 102, an In-Process Tracking and Archiving System 104, and In-Bound Data Capture of Return Mail System 106 and an Address and Information Database 110. In alternate embodiments, the system 100 could include other devices suitable for providing more detailed information and a mailpiece, while reducing the number of codes printed on a mailpiece.

Figure 2:
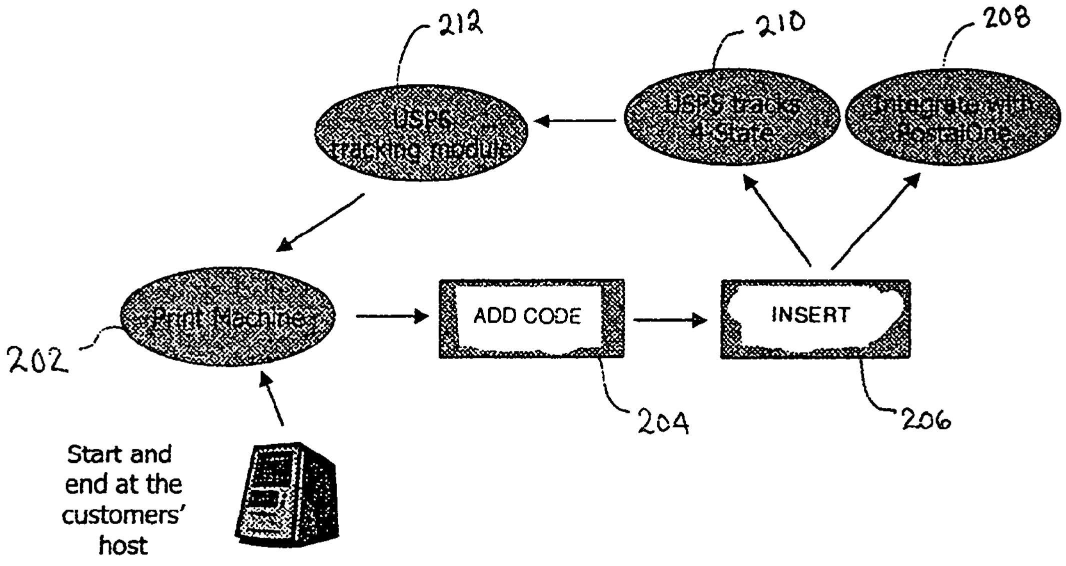
FIG. 2 is a block diagram of one embodiment of the tracking and reporting process in a system incorporating features of the present invention.

In one embodiment, referring to FIG. 2, the tracking and reporting system 102 of FIG. 1 is generally adapted to integrate address information in the form of for example, a four-state barcode, on the mailpiece for tracking and confirmation purposes. The term "mailpiece" as used herein, generally refers to a document that is to be mailed, such as for example, a letter, an invoice or other similar types of correspondence. The term "mailing package" is generally used to refer to the facility within which the document to be mailed is placed, such as for example an envelope, mailer or mail pack, for mailing purposes.

Referring to FIG. 2, a document management device or system 202 is used to merge address data for printing on mailpieces, such as for example, documents, cards and letters. The document management system 202 includes data input and data output and manages the data to provide the needed output. The document management system 202 can include a printing system to print the data. It is a feature of the present invention to print indicia on the actual mail piece that would be contained within an envelope, for example. The document management system 202 can include the source print file 201 and tracking software 203. The document management system 202 can produce a printed mail item or piece, such as letters 204 and add a unique code, such as for example, a four-state barcode 206, to or in the area where, for example, the address is printed on the letter. In alternate embodiments, the code can be placed or printed in any suitable location on the mail piece where it can be read, scanned and tracked. The four-state barcode can also be added to the address block area, or such other suitable area, of the envelope containing the mailpiece in order to permit the envelope or other such suitable mailpiece carrying instrument, or mailer, to be tracked through the mail system, such as for example, the USPS. Tracking information can be provided by the mail system tracking system 210 via, for example, a tracking module 212. The tracking module 212 can transmit tracking information to the document management system 202 where that information can be processed for data reporting.

The tracking and reporting system can provide proof of printing and postal processing. The document management system 202 of FIG. 2 is generally adapted to retrieve address files from a database and convert them into, for example, a four-state code. The address data and information content results of the document management system 202 after a merge operation can be sent to a printer to produce documents 204 with address information and the code added to the letters 204 and, if desired, the envelopes 206.

In one embodiment, the document management system 202 can also create a code, such as for example, a Four State Code or a PLANET CODE™, that can be printed on the mailpiece or document and linked to the document in a file, database or data tracking system, in or external to the document management system 2002. The document management system can also be adapted to create or build a link to upload an electronic manifest and payment information to the mail system, such as the USPS POSTAL ONE™.

The document management system 202 can track the code printed on the document and envelope. In one embodiment, by linking the mail service or other such tracking code to the mailpiece, the document management system 202 can use the mail service codes to track the progress of the mailpeices through the mail system. For example, the USPS generally tracks the four-state code in a separate database. By linking into or accessing that database, the user or home station can also track the progress of the mailpiece as it progresses through the mail system from its point of origin to its destination, as well as its return if needed.

Figure 3:
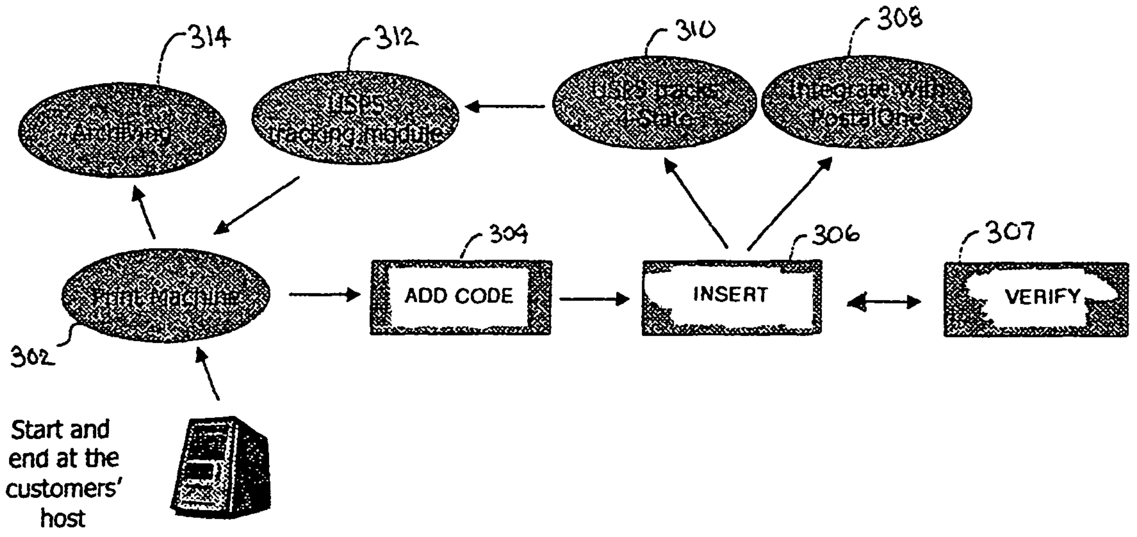
FIG. 3 is a block diagram of one embodiment of a system incorporating features of the present invention including in-process tracking and archiving.

Referring to FIG. 3, the in-process tracking and archiving system 104 of FIG. 1 generally provides proof of printing of a mailpiece or document and can recreate the mailpiece or document if necessary. The archiving system 104 stores an exact copy of the printed document in any suitable electronic or imaging format, such as for example, a PDF document.

As referred to previously, the mailpiece or document is produced and printed via the document management system 302, the code added to the document 304 and the document is inserted 306 into for example, an envelope. The address information and code can also be added to the envelope. In order to verify the actual insertion of the mailpiece into its carrying instrument, as the document is inserted into for example an envelope, the verification system 307 monitors the insertion process to insure that the document is properly inserted into the envelope. In one embodiment, the verification device or system 307 comprises a camera or optical character recognition device that monitors and verifies the insertion of the document into the envelope or mailing instrument. The verification device 307 can verify that each page of a multi-page document or mailpiece is inserted. For example, if a camera is used, the camera could monitor, capture and record the insertion process, and can verify that each page of the document has been inserted. The insertion process image could be recorded and saved in an electronic form. In another embodiment, the document could include a character or code that is viewable through a window or other opening in the mailing instrument after the document is properly inserted. When the insertion is complete, the verification system would scan the mailing instrument for the code to verify that the document is properly inserted. In one embodiment, each page of the document could include a character or code that is read as the page is inserted into the mailing package. In another embodiment, locator marks could be printed or formed on the document in various positions and locations that allow the locator marks to be scanned and read as the document is inserted. The term "document" can include a multiple page document, where marks are included on each page of the document, and the verification process monitors the insertion of each page of the document. The reading of a mark would be a measure of the progress and state of the insertion process. It is a feature of the present invention to verify the insertion of a document into a mailing package down to the page level. In a mail inserter system, the verification device would be located, for example, at the back of the inserter.

At the time the document is created by the document management system 302, an electronic copy of the document can be archived in an archiving system 314. The copy of the document is linked to the unique identifier on the piece so that the copy of the document can be properly indexed and retrieved if needed. When the document is created by the document management system 302, a unique identifier can be printed with the address information. By linking the unique identifier to the printed document, the identifier can point back to a location or file in for example, a database, where the copy of the document is stored, should it need to be recreated.

Figure 4:
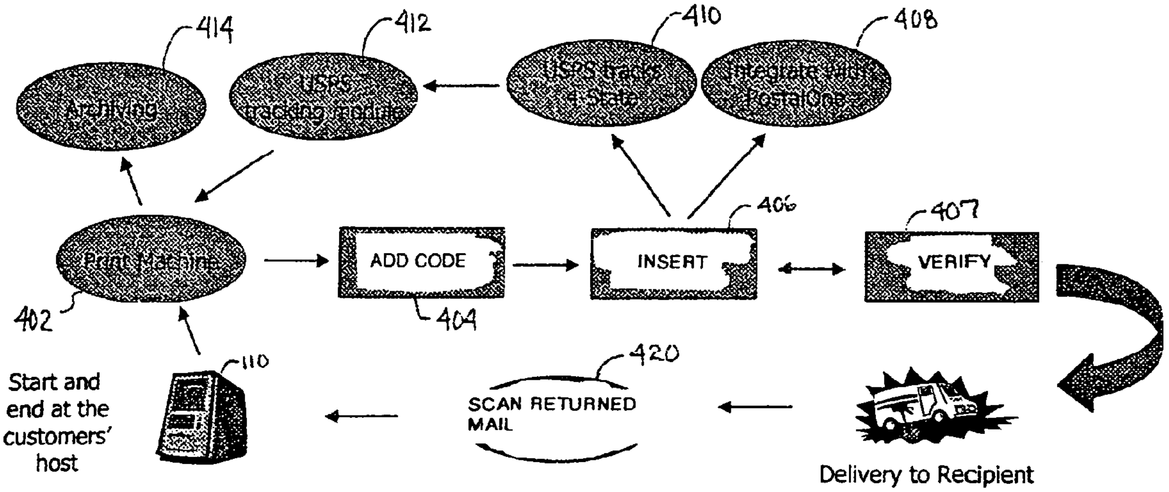
FIG. 4 is a block diagram of one embodiment of a system incorporating features of the present invention including inbound data capture of returned mail.

Referring to FIG. 4, the inbound data capture of returned or received mail system 106 of FIG. 1 generally completes the life cycle of a document from mail send to the mail returned stage.

In some instances, a document being returned in the mail needs to be related to information stored in a database or other information storage unit when it is received at the in-processing facility. For example, when a customer pays an invoice, such as a utility invoice, the invoice together with the payment must be linked to the information stored within the utility system in order to update the utility system records that payment has or has not been made, preferably in a timely manner. In order to eliminate manual key entry and sorting, which is prone to error and delay, the unique code printed on the invoice or payment stub can be used to link the invoice document to the corresponding information and data in the host application. The data in the invoice document, such as the amount paid and the date payment is received, can be interpreted in any suitable manner and uploaded to the host application.

For example, when the invoice document such as a payment stub is returned and processed, the unique code on the invoice document is scanned 420 as it is received and in-processed. The information pertaining to the invoice document is verified and by linking it to the code on the document the user account data is located in the database 110 and the related information can be retrieved. In one embodiment, the unique identifier, such as a barcode, could be detailed enough to include adequate information related to the document and corresponding account, to eliminate the need to return to the database for follow-up information.

Any additional information on the document could also be scanned or electronically processed and uploaded to the database to update for example, address changes or other account information.

Figure 5:
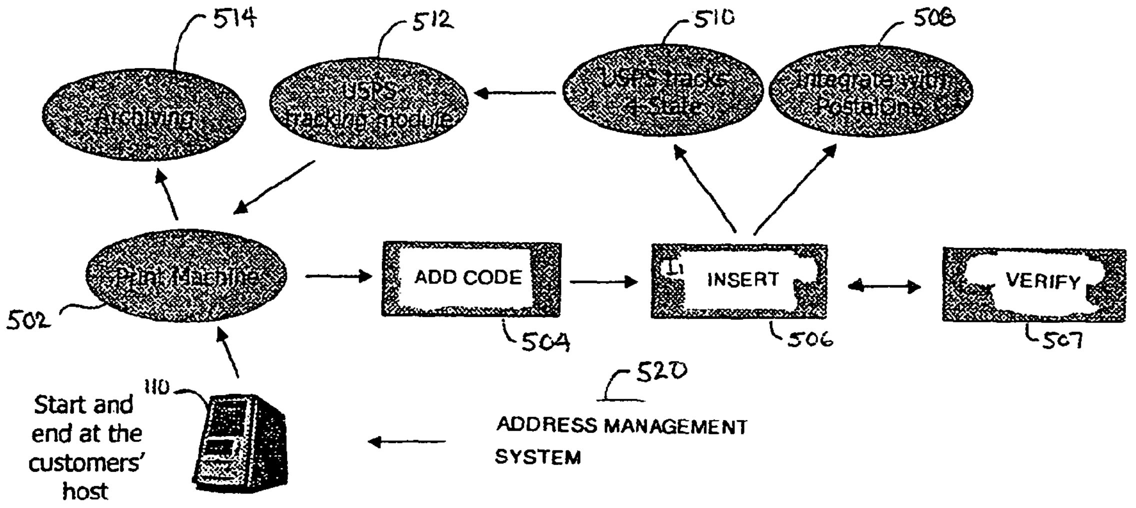
FIG. 5 is a block diagram of one embodiment of a system incorporating features of the present invention including postal address update and management.

In one embodiment, referring to FIG. 5, the system 100 of FIG. 1 can also include a postal address update and management system 108. The system 108 generally provides maintenance of up-to-date address files. In one embodiment, the proof can be stored in a separate database, such as database 114 in FIG. 1.

As shown in FIGS. 1 and 5, the document management/output management system 502 obtains address information from the address and information database 110. The address data and information retrieved from the database 110 is used to produce the address information for printing of the mail document or letter 504 in FIG. 5. After the document 504 is inserted 506 into for example an appropriately addressed envelope, or other suitable mailing instrument, on which the identifying code such as the 4-state code can also be included, the envelopes can be tracked 510 in the USPS system by, for example, the tracking module 512. In one embodiment, the address information can be verified and any address errors corrected by interfacing with the postal system address databases. By interfacing with the postal system resources 508, errors in addresses can be corrected, including format, locations and recipient address change errors. Any updates or corrections can be transmitted back from the postal resources 508 to the address management system 520 so that the address database 110 can be updated.

Figure 6:
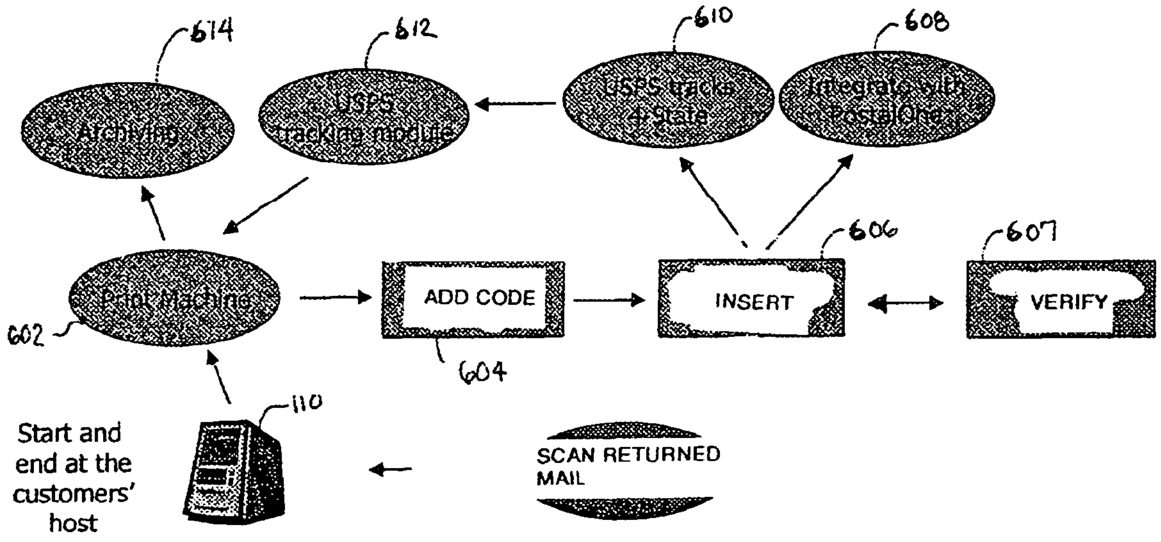
FIG. 6 is a block diagram of one embodiment of a system incorporating features of the present invention including information based indicia or similar bar codes.

In one embodiment, referring to FIG. 6, the unique code, such as the four-state barcode could be supplemented or replaced by an information based indicia ("IBI"). After the letter or document is produced, an IBI can be added 604 to the document. In alternate embodiments, the IBI can be added to the document during the initial printing stage in the document management system 602. The IBI can generally be used as proof of payment. The IBI can allow for prepayment of mail services, such as for example, postage. The IBI could be printed for example, in the address block on the mailpiece. The use of the IBI allows for payment information to be checked or verified at any point in the system and during the mail process. The document or mailpiece is inserted 606 into an appropriate mailing instrument, the insertion being verified 607 by the verification system. The present invention provides an integration of technology enabled by the Postal or mail service tracking capability. By linking the mail creation print file with an archival and retrieval system, in process tracking and the Postal Service's tracking solution, a seamless tracking, validation and reproduction/regeneration system is created. Postage is automatically paid for and addresses are verified and corrected for Postal compliance and correctness. Letters are tracked to the page level by identifying that all the pages were printed and identifying that the pages were inserted into the envelope. The disclosed embodiments provide the ability to identify exactly what pages were printed, identify exactly what pages were in the envelope and the ability to reprint the exact contents of the envelope. The envelope can be identified as to whether it is a reply mail coming back and which specific reply mail is it that is coming back, and consequently determine the contents and what is expected inside the envelope.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A mail system for sending a mailpiece in a mailing package to a recipient and identifying the mailpiece when the mailpiece is received back from the recipient, the system comprising:

a tracking and reporting system that:

retrieves address information for the recipient from an account database; and prints a unique code on at least one page of a mailpiece, wherein the unique code is linked with the specific mailpiece and the retrieved address information, wherein the mailpiece is inserted into the mailing package for sending to the recipient; and an in-bound data capture of return mail system that:

receives the mailpiece in a package that is sent by the recipient;

scans the unique code on the received mailpiece; and based on the scanned unique code, automatically links the received mailpiece to account information stored in the account database.

2. The system of claim 1, wherein the unique code comprises a four-state barcode that allows the mailing package to be tracked.

3. The system of claim 1, wherein the unique code comprises a pointer that refers back to a database that associates the mailpiece to the original source file.

4. The system of claim 1, wherein the in-bound data capture of return mail system comprises:

a scanning device to scan the unique code printed on the mailpiece as the mailpiece is received in a processing center;

wherein the account database receives the scanned code from the scanning device and links the scanned code to information stored in the account database related to the mailpiece; and a controller that updates the information in the account database based on a content of the mailpiece.

5. The system of claim 1 further comprising, in the tracking and reporting system, an information based indicia on the mailpiece for proof-of-payment.

6. The system of claim 1, wherein the unique code is generated based at least in part upon the retrieved address information.

7. The system of claim 1, wherein the tracking and reporting system prints the retrieved address information and the unique code on at least one page of a mailpiece.

8. The system of claim 1, further comprising:

a postal address update and management system that is linked to a postal service database for verifying address information and correcting address errors.

9. The system of claim 8, wherein the postal address and update management system comprises:

an address update system that links changes in a postal system address database to an address associated with the unique code.

* * * * *